United States Patent [19]

Chion et al.

[11] 4,454,091

[45] Jun. 12, 1984

[54] SOLUTIONS, WHICH CAN BE SHAPED, FROM MIXTURES OF CELLULOSE AND POLYVINYL CHLORIDE, AND SHAPED ARTICLES RESULTING THEREFROM AND THE PROCESS FOR THEIR MANUFACTURE

[75] Inventors: Pierre Chion, Bron; Jacques Menault, Charbonnieres-les-Bains; Henry Rodier, Sainte-Foy-les-Lyon; Jean-Paul Sacré, Meyzieu, all of France

[73] Assignee: Rhone-Poulenc-Textile, Paris, France

[21] Appl. No.: 272,251

[22] Filed: Jun. 10, 1981

[30] Foreign Application Priority Data

Jun. 10, 1980 [FR] France .................. 80 12922

[51] Int. Cl.$^3$ .................. C08K 5/41; D01F 8/04
[52] U.S. Cl. .................. 264/171; 264/184; 264/187; 428/373; 428/374; 524/35
[58] Field of Search .................. 264/83, 184, 187, 205, 264/207, 208, 290.2, 290.5, 171; 106/163 R; 260/17.4 CL, 17.4 R, 30.8 DS; 428/373, 374, 393; 524/35

[56] References Cited

U.S. PATENT DOCUMENTS

| | | | |
|---|---|---|---|
| 2,617,777 | 11/1952 | Heisenberg et al. | 260/30.8 DS |
| 3,109,828 | 11/1963 | Roeser | 260/30.8 DS |
| 3,316,336 | 4/1967 | Smith | 428/373 |
| 4,097,666 | 6/1978 | Johnson et al. | 536/57 |
| 4,098,996 | 7/1978 | Ryan et al. | 536/37 |
| 4,129,640 | 12/1978 | Rodier | 264/187 |
| 4,145,391 | 3/1979 | Rodier | 264/83 |
| 4,173,613 | 11/1979 | Rodier | 264/187 |
| 4,252,766 | 2/1981 | Baldini et al. | 264/187 |
| 4,381,370 | 4/1983 | Aaltonen et al. | 324/54.21 |

FOREIGN PATENT DOCUMENTS

| | | |
|---|---|---|
| 76067 | 12/1970 | Fed Rep. of Germany . |
| 89003 | 4/1972 | Fed Rep. of Germany . |
| 1359178 | 3/1964 | France . |
| 2372251 | 6/1978 | France . |
| 2358435 | 10/1978 | France . |
| 1197322 | 7/1970 | United Kingdom . |
| 2072684A | 10/1981 | United Kingdom . |

*Primary Examiner*—Veronica P. Hoke
*Attorney, Agent, or Firm*—Murray, Whisenhunt & Ferguson

[57] ABSTRACT

The present invention relates to new polymer solutions which make it possible to obtain shaped articles such as yarns and fibres, films, sheets and the like.

These solutions consist of cellulose having a degree of polymerization of at least 200, polyvinyl chloride, dimethyl sulphoxide and formaldehyde, the weight ratio cellulose/polyvinyl chloride being 0.05 to 0.5, preferably 0.1 to 0.5, the ratio formaldehyde/cellulose being 0.2 to 2 and the total polymer concentration being 6 to 20%, preferably 10 to 18%.

Such solutions are particularly suitable for the manufacture of filaments consisting of fibrils substantially orientated along the axis of the fibre and closely interlaced, the cellulose macromolecules being partially involved in a crystal lattice characteristic of cellulose II. The filaments possess valuable properties for textile use.

20 Claims, No Drawings

SOLUTIONS, WHICH CAN BE SHAPED, FROM MIXTURES OF CELLULOSE AND POLYVINYL CHLORIDE, AND SHAPED ARTICLES RESULTING THEREFROM AND THE PROCESS FOR THEIR MANUFACTURE

The present invention relates to new solutions which can be shaped and which are capable of being converted to yarns, fibres, films, membranes, pellicles and the like, and to a process for their manufacture. It also relates to the yarns and fibres obtained from these solutions and to the process for the manufacture of the said yarns and fibres.

More particularly, the present invention relates to solutions which can be shaped and which contain cellulose and a polyvinyl chloride, to the process for their manufacture and to the shaped articles obtained from these solutions.

BACKGROUND OF THE INVENTION

It is already known from British Pat. No. 1,197,322 to prepare a solution of cellulose in a mixture comprising dimethylformamide in the presence of an amine and sulphur dioxide, in which solution part of the dimethylformamide can be replaced by dimethyl sulphoxide, and to mix it with a solution of polyvinyl chloride in dimethylformamide. The British patent teaches that polyvinyl chloride is insoluble in dimethyl sulphoxide. Generally the starting cellulose solution contains one part by weight of cellulose for at least each four parts by weight of the dimethyl sulphoxide or other organic solvent, such as acetonitrile or dimethylformamide. At least 2.5 moles each of sulphur dioxide and the amine are used per mole of anhydroglucose unit of the cellulose. The patent does not teach the production of filaments or the spinning of the described cellulose/polyvinyl chloride solutions. In any event, however, the concentrations used (4% in the case of cellulose solution and 2% in the case of the polyvinyl chloride solution) are too low to permit the manufacture of fibres with good properties.

Commonly assigned U.S. Pat. No. 4,129,640 discloses a process for producing shaped articles of cellulose, wherein a shapable solution of cellulose in DMSO and formaldehyde, containing at least 6% by weight of cellulose, and having a weight ratio of formaldehyde/cellulose of about 0.2 to about 0.6, is contacted with a coagulating solution of DMSO and water at a temperature no greater than 10° C. The coagulant bath contains 30–50% by weight of DMSO, with coagulation occurring generally in less than 20 seconds.

Commonly assigned U.S. Pat. No. 4,145,391 discloses a process for producing shaped cellulosic articles, wherein a solution of cellulose in DMSO and formaldehyde, at a formaldehyde/cellulose weight ratio of 0.2–2, and at a cellulose concentration of at least 6% by weight, is spun into a gaseous atmosphere containing ammonia.

Commonly assigned U.S. Pat. No. 4,173,613 is directed to a process for producing shaped cellulosic articles, wherein a solution of cellulose and DMSO and formaldehyde, at a formaldehyde/cellulose weight ratio of 0.2–2, and at a cellulose concentration of at least 6% by weight, is spun into a coagulant bath containing water, DMSO and ammonia or an ammonium salt.

Copending, commonly assigned application Ser. No. 147,221, filed May 6, 1980, now U.S. Pat. No. 4,377,648 issued Mar. 22, 1983 discloses shapable polymeric solutions containing cellulose having a degree of polymerisation of at least 200, an acrylonitrile polymer, dimethyl sulphoxide and formaldehyde, with the weight ratio of cellulose/acrylonitrile polymer being between 0.05 and 1, the weight ratio of formaldehyde/cellulose being between 0.2 and 2, and the total polymer concentration in the solution being between 12 and 30% by weight. The solutions may be extruded into a coagulating bath containing 25 to 80% by volume of water and 75 to 20% by weight of dimethyl sulphoxide, and maintained at a temperature of between 0° and 40° C., thereafter orientated, and at least substantially freed of solvent.

Copending, commonly assigned application Ser. No. 244,135, filed Mar. 16, 1981, now U.S. Pat. No. 4,363,895 issued Dec. 14, 1982, discloses shapable polymer solutions containing cellulose having a degree of polymerisation of at least 200, a polyamide-imide polymer, dimethyl sulphoxide and formaldehyde, with a weight ratio of cellulose/polyamide-imide being between 0.05 and 1, the weight ratio of formaldehyde/cellulose being between 0.2 and 2, and the total polymer concentration being between 6 and 25% by weight. These solutions may be spun into a coagulating bath containing water and 75 to 20% by volume of dimethyl sulphoxide, maintained at a temperature between 0° and 40° C., with the filaments being obtained orientated, freed of solvent, and overstretched at a temperature above 290° C.

SUMMARY OF THE INVENTION

The solutions, which can easily be shaped, according to the present invention consist of:
  cellulose having a degree of polymerisation of at least 200,
  polyvinyl chloride,
  dimethyl sulphoxide and
  formaldehyde; in these solutions, the weight ratio cellulose/polyvinyl chloride is between 0.05 and 0.5, the weight ratio formaldehyde/cellulose is between 0.2 and 2 and the total concentration of polymers is between 6 and 20% by weight.

To manufacture yarns and fibres, it is generally preferred to use solutions having a polymer concentration of between 10 and 18% by weight and a water content which is less than or equal to 5,000 ppm, and possessing a weight ratio cellulose/polyvinyl chloride of between 0.1 and 0.5.

The invention also relates to a process for the manufacture of the solutions, which can be shaped, according to the present invention, wherein a solution of polyvinyl chloride in dimethyl sulphoxide is mixed, whilst stirring, at a temperature which is above or equal to 80° C., with a solution, in a mixture of dimethyl sulphoxide (DMSO) and formaldehyde, of cellulose having a degree of polymerisation of at least 200, which has been dried beforehand, the total polymer concentration being between 6 and 20% and the weight ratio cellulose/polyvinyl chloride being between 0.05 and 0.5.

The present invention also relates to filaments, fibres and yarns based on cellulose and on polyvinyl chloride in a weight ratio cellulose/polyvinyl chloride of between 0.05 and 0.5 and preferably of between 0.1 and 0.5, in which each polymer is present in the form of fibrils substantially orientated along the axis of the fibre and closely interlaced with one another, the cellulose macromolecules being partially involved in a three-dimensional crystal lattice characteristic of cellulose II, and the polyvinyl chloride constituent being present in the form of a continuous three-dimensional fibrillar lattice.

Depending on the conditions of manufacture, the cellulose fibrils can also form a continuous three-dimensional lattice.

The yarns and fibres according to the invention also possess a water retention capacity of at least 15, determined in accordance with DIN Standard Specification 53,814.

Finally, the present invention relates to a process for the manufacture of the said yarns and fibres, wherein the solutions according to the invention, in which the total polymer concentration is between 6 and 20%, are wet-spun into a coagulating bath essentially consisting of water and dimethyl sulphoxide in respective proportions of 20 to 80% of water and 80 to 20% by volume of dimethyl sulphoxide, the said bath being kept at between 0° and 60° C., the filaments are orientated, the solvent is removed and, preferably, the said filaments are dried.

DETAILED DESCRIPTION OF THE INVENTION

To prepare the solutions according to the invention, it is possible to use cellulose I, referred to as native cellulose, of any origin, for example cotton linters or wood pulp, or cellulose II possessing a degree of polymerisation of at least 200, originating, for example, from waste fibres or films of regenerated cellulose or of alkali-cellulose, which have been neutralised and washed.

The starting cellulose, having a degree of polymerisation of at least 200, is shredded and, if necessary, dried, and it is then pre-swollen in DMSO which has optionally been dried beforehand. Formaldehyde in the form of paraformaldehyde is then added and the temperature is raised preferably to between 90° and 140° C., in accordance with the process described in French application No. 2,358,435 of Société Rhovyl, published on 10/02/1978, the disclosure of which is hereby incorporated by reference.

The weight ratio formaldehyde/cellulose largely depends on the cellulose used. It is generally preferable to use a ratio formaldehyde/cellulose which is the higher, the lower the accessibility of the cellulose employed. In practice, to dissolve cellulose I, it is preferable to use a ratio formaldehyde/cellulose of at least 1, whilst in the case of cellulose II, it is possible to use a ratio of at least 0.6 at the dissolution stage.

To facilitate the subsequent conversion, this ratio can then optionally be reduced to a value of between 0.2 and 2 by removing the formaldehyde by any known means, such as entrainment by a preferably inert, anhydrous gas or distillation under reduced pressure, without the risk of gel formation or coagulation, provided, however, that the ratio formaldehyde/cellulose remains equal to at least 0.2.

Preferably, the formaldehyde used in the present invention is in the form of paraformaldehyde.

It is also desirable for the water content of the various reactants to be low, for example for the water content of the cellulose to be less than 1%, that of the dimethyl sulphoxide to be less than or equal to 1% and that of the paraformaldehyde to be less than 4% by weight.

The term "polyvinyl chloride" is understood as meaning crystallisable or non-crystallisable vinyl chloride homopolymers, or their copolymers containing at least 80% by weight of vinyl chloride units and up to 20% of other vinyl compounds which can be polymerised with vinyl chloride (for example vinylidene chloride, acrylonitrile and vinyl esters, such as vinyl acetate, acrylates, methacrylates and esters of maleic or fumaric acid, and the like), or mixtures of vinyl chloride homopolymer with superchlorinated polyvinyl chloride, such as those described in French Pat. No. 1,359,178 and and its addition Pat. No. 85,126 of Société Rhovyl. The polyvinyl chloride will be in the shapable molecular weight range.

To prepare the shapable solutions according to the present invention, the solution of polyvinyl chloride, in dimethyl sulfoxide as defined above, is mixed with a solution, in dimethyl sulphoxide and formaldehyde, of cellulose, with intense and continuous stirring, for at least 30 minutes, at a temperature which is above or equal to 85° C. Preferably, a known heat stabiliser, such as a tin salt, is added to to this solution in the usual proportions, for example of the order of 5 parts per 1,000 parts by weight of polymer, in order to prevent any discoloration of the solution.

The two solutions (the polyvinyl chloride solution and the cellulose solution) are mixed with intense stirring and with heating at a temperature of at least 80° C. for at least 30 minutes. The solution thus obtained must reach the spinneret at a temperature of at least 80° C.

The solutions according to the invention can be used to manufacture very diverse articles, such as yarns, fibres, films, sheets, pellicles and the like.

The solutions suitable for spinning are those having a total polymer concentration of between 6 and 20%, preferably of between 10 and 18%, a ratio cellulose/polyvinyl chloride of between 0.05 and 0.5 and a water content of less than 5,000 ppm. However, to carry out uniform industrial spinning and manufacture fibres with good characteristics, this polymer concentration will be at least 10%, preferably between 10 and 18%, and the ratio cellulose/polyvinyl chloride will be between 0.1 and 0.5. The said solutions can be dry-spun in accordance with any process known to those skilled in the art, for example in accordance with French patent application No. 2,372,251, published on 6/23/78, the disclosure of which is hereby incorporated by reference. Preferably, they are spun into a coagulating bath essentially consisting of water and dimethyl sulphoxide in respective proportions of between 20/80 and 80/20 by volume, the bath being kept at a temperature between 0° and 60° C. The bath may also be, in the form of a dilute aqueous solution of ammonia for example up to 5% of pure ammonia or even more. The filaments are subjected to molecular orientation, which can be carried out in the coagulating bath, or subsequently, by stretching in one or more stages, for example in air and then in an aqueous bath, the second stretching being optionally preceded and preferably followed by drying, for example at ambient temperature.

After they have left the coagulating bath, the filaments are freed of the solvent by washing with water, preferably after the first stretching. The washing can also be carried out by means of dilute solutions of ammonia, in order to prevent the strands from sticking. The filaments can subsequently be dried and stretched in boiling water and then dried again and sized. The total stretching ratio is generally at least 1.5×, preferably not more than 9×. If necessary, the filaments can also be subjected to a shrinking treatment, for example in boiling water or steam.

The yarns and fibres according to the present invention comprise polyvinyl chloride fibrils substantially orientated in the direction of the axis of the fibre and closely interlaced with cellulose fibrils, which are also orientated along the axis of the fibre, the cellulose macromolecules being partially involved in a three-dimensional crystal lattice characteristic of cellulose II. The polyvinyl chloride fibrils form a continuous three-dimensional lattice along the whole length of the filaments. The length of the cellulose fibrils increases with the weight ratio cellulose/polyvinyl chloride. Depending on the manufacturing conditions, for example the stretching and the ratio cellulose/polyvinyl chloride, the cellulose fibrils can also form a continuous three-dimensional lattice.

The yarns and fibres thus obtained simultaneously possess a good absorption capacity, a good dyeing affinity, a lower density and a better heat stability, in particular compared with fibres of pure polyvinyl chloride, even when the yarns and fibres of the present invention contain small proportions of cellulose.

Although the mechanical properties of such yarns and fibres are not substantially improved, compared with polyvinyl chloride fibres, the water retention capacity of the said yarns and fibres is at least 20%, determined in accordance with DIN Standard Specification No. 53,814, whilst that of polyvinyl chloride fibres not containing cellulose is only of the order of 3%. This improved characteristic, which is not sufficiently explained only by the presence of cellulose, makes the fibres very comfortable to wear, by rapidly absorbing the body moisture, which can subsequently evaporate from the surface of the textile.

Starting from the solutions of the present invention, it is also possible to obtain films, sheets, pellicles and the like in accordance with any known process.

The following examples, in which the parts and percentages are understood to be by weight, unless indicated otherwise, are given by way of indication, but without implying a limitation, in order to illustrate the invention.

EXAMPLE 1

A. A 12.5% by weight strength solution of a polyvinyl chloride having an average number molecular weight of 60,000 in dimethyl sulphoxide is prepared by continuous stirring for 30 minutes at a temperature of at least 85° C.

B. An 8% strength by weight solution of cellulose in dimethyl sulphoxide is prepared separately in the following manner:

106 g of Viscokraft pulp having a degree of polymerisation of 450 and a moisture content of 6% are dried and then introduced into 1,115 g of dimethyl sulphoxide containing 500 ppm of water. 125 g of 96% pure paraformaldehyde are added (ratio paraformaldehyde/cellulose: 1.20).

The mixture is heated for 5 hours at 135° C., whilst stirring. After dissolution, part of the paraformaldehyde is removed by bubbling a stream of dry nitrogen through the solution at 120° C., which lowers the ratio paraformaldehyde/cellulose to 0.35.

The two solutions are mixed at a temperature above 85° C., with intense stirring, for at least 30 minutes, in the proportions required to obtain a ratio cellulose/polyvinyl chloride of 0.2, and the resulting solution, having a polymer concentration of 11.4% is kept at this temperature and fed to a spinneret having 64 orifices each of diameter 0.055 mm. The spun filaments are coagulated in a bath, kept at 27° C., containing a mixture of DMSO and water in proportions of 60/40 by volume.

The filaments are subsequently drawn in air in a ratio of 1.4× and then washed with ammonia water (30 g/liter) counter-currently, at ambient temperature, dried at ambient temperature, stretched again in boiling water in a ratio of 2× and then dried again and sized.

The filaments thus obtained consist of two continuous fibrillar lattices, which are seen in the optical microscope by dissolving one or the other phase alternatively. In section, the filaments show cellulose inclusions of jagged shape, located randomly inside a polyvinyl chloride matrix.

The filaments possess average mechanical properties and a particularly high absorption capacity, according to DIN Standard Specification 53,814, which is not sufficiently explained by the ratio cellulose/polyvinyl chloride of 0.2. In fact, the absorption capacity is 50%, whilst that of fibres based only on polyvinyl chloride is 3%.

EXAMPLE 2

The two solutions of Example 1 are mixed at a temperature of about 80° C. with intense stirring, for 1 hour, in the proportions required to obtain a ratio cellulose/polyvinyl chloride of 0.1, and the resulting solution, having polymer concentration of 11.9%, is kept at this temperature and fed to a spinneret having 200 orifices each of diameter 0.09 mm. The filaments are coagulated in a bath, kept at 50° C., containing a mixture of DMSO and water in proportions of 56/44 by volume, to which 10% by volume of a 20% by weight strength aqueous solution of ammonia is added.

The filaments are subsequently stretched in air in a ratio of 1.17× and then counter-currently washed with ammonia water (30 g/liter) at ambient temperature, stretched again in boiling water in a ratio of 4.64× and then dried under tension on rollers kept at 150° C. (total stretching ratio: 5.42×) and sized. The filaments possess the following mechanical characteristics:

| | |
|---|---|
| tensile strength, g/tex | 20.83 |
| elongation, % | 15.28 |
| modulus of elasticity, g/tex | 404 |
| absorption capacity (according to DIN Standard Specification 53,814), % | 59.9 |
| density | 1.3365 |
| heat shrinkage at 100° C., % | 25.84 |
| maximum shrinkage (at 160° C.), % | 51.68 |

By way of comparison, the heat shrinkage of filaments based only on polyvinyl chloride, obtained from solution A of Example 1, was measured under identical conditions:

| | |
|---|---|
| heat shrinkage at 100° C., % | 49.05 |
| maximum shrinkage (at 155° C.), % | 68.98 |

EXAMPLE 3

The two solutions of Example 1 are mixed at a temperature of about 80° C. with intense stirring, for 1 hour, in the proportions required to obtain a ratio cellulose/polyvinyl chloride of 0.2, and the resulting solution, having a polymer concentration of 11.4%, is kept at 80°

C. and fed to a spinneret having 200 orifices each of diameter of 0.09 mm. The filaments are coagulated in a bath, kept at 50° C., containing a mixture of DMSO and water in proportions of 56/44 by volume, to which 10% by volume of a 20% by weight strength aqueous solution of ammonia is added.

The filaments are subsequently stretched in air in a ratio of 1.09× and then counter-currently washed with ammonia water (30 g/liter) at ambient temperature, stretched again in boiling water in a ratio of 4.58× and then dried under tension on rollers kept at 150° C. (total stretching ratio: 5×) and sized. The filaments possess the following mechanical characteristics:

| | |
|---|---|
| tensile strength, g/tex | 16.65 |
| elongation, % | 17.25 |
| modulus of elasticity, g/tex | 257 |
| absorption capacity (according to DIN Standard Specification 53,814), % | 55.1 |
| density | 1.3355 |
| heat shrinkage at 100° C., % | 18.25 |
| maximum shrinkage (at 157° C.), % | 37.49 |

EXAMPLE 4

The two solutions of Example 1 are mixed at a temperature of about 80° C. with intense stirring, for 1 hour, in the proportions required to obtain a ratio cellulose/polyvinyl chloride of 0.3, and the resulting solution, having a polymer concentration of 11.06%, is kept at 80° C. and fed to a spinneret having 200 orifices each of diameter 0.09 mm. The filaments are coagulated in a bath, kept at 50° C., containing a mixture of DMSO and water in proportions of 56/44 by volume, to which 10% by volume of a 20% strength ammonia solution is added.

The filaments are subsequently stretched in air in a ratio of 1.17× and then counter-currently washed with water at ambient temperature, stretched again in boiling water in a ratio of 4.64× and then dried under tension on rollers kept at 150° C. (total stretching ratio: 5.42×) and sized. The filaments possess the following mechanical characteristics:

| | |
|---|---|
| tensile strength, g/tex | 12.62 |
| elongation, % | 55 |
| modulus of elasticity, g/tex | 153 |
| absorption capacity (according to DIN Standard Specification 53,814), % | 45.7 |
| density | 1.3658 |
| heat shrinkage at 100° C., % | 18.97 |
| maximum shrinkage (at 153° C.), % | 43.16 |

We claim:
1. Process for the manufacture of yarns, filaments and fibers, said process comprising:
   (a) providing a spinnable solution consisting essentially of:
      cellulose having a degree of polymerization of at least 200;
      polyvinyl chloride polymer selected from the group consisting of vinyl chloride homopolymers, copolymers thereof containing at least 80% by weight of vinyl chloride units and up to 20% by weight of copolymerizable other monomer units, and mixtures of vinyl chloride homopolymer with super chlorinated polyvinyl chloride;
      dimethyl sulfoxide; and
      formaldehyde; the weight ratio of cellulose/polyvinyl chloride polymer being between 0.05 and 0.5, the weight ratio of formaldehyde/cellulose being between 0.2 and 2, the total polymer concentration of the solution being between 6 and 20% by weight, and the chlorine content of the polyvinyl chloride polymer being at least 45% by weight; and
   (b) spinning said solution through a spinnerette into contact with a coagulating medium to obtain said yarns, filaments and fibers.
2. Process according to claim 1 wherein said coagulating medium consists essentially of water and dimethyl sulfoxide in respective proportions 20/80 to 80/20 by volume, said medium being kept at between 0° and 60° C., said filaments being oriented and freed of solvent.
3. Process according to claim 1 wherein the total polymer concentration of the solution is between 10 and 18%.
4. Process according to claim 1 wherein the coagulating medium contains a small proportion of ammonia.
5. Process according to claim 1 wherein the filaments are washed and then oriented by stretching.
6. Process according to claim 1 wherein the filaments are washed with water.
7. Process according to claim 1 wherein the filaments are washed with a dilute aqueous solution of ammonia.
8. Process according to claim 1 wherein the filaments are subjected to two stretching steps and are dried after the second stretching.
9. Fibers, filaments and yarns based on cellulose and polyvinyl chloride, said fibers, filaments and yarns being formed according to the process as claimed in claim 1, the weight ratio of cellulose/polyvinyl chloride in said fibers, filaments and yarns being between 0.5 and 0.5, each polymer being present in the form of fibrils substantially oriented along the axis of the fiber and closely interlaced, with the cellulose macromolecules partially involved in a three-dimensional crystal lattice characteristic to cellulose II and the polyvinyl chloride fibrils forming a continuous three dimensional lattice.
10. Fibers, filaments and yarns according to claim 9, wherein the weight ratio of cellulose/polyvinyl chloride is between 0.1 and 0.5.
11. Fibers, filaments and yarns according to claim 9, possessing a water retention capacity of at least 20%, determined in accordance with DIN Standard Specification No. 53,814.
12. Shapable solutions consisting essentially of;
   (a) cellulose having a degree of polymerization of at least 200,
   (b) polymer selected from the group consisting of vinyl chloride homopolymers, copolymers thereof containing at least 80% by weight of vinyl chloride units and up to 20% by weight of copolymerizable other monomer units, and mixtures of vinyl chloride polymer with superchlorinated polyvinyl chloride,
   (c) dimethyl sulphoxide and
   (d) formaldehyde, the weight ratio of cellulose/polyvinyl chloride being between 0.05 and 0.5, the weight ratio formaldehyde/cellulose being between 0.2 and 2 and the total polymer concentration of the solutions being between 6 and 20% by weight.

13. Solution of claim 12, wherein the other monomer units are selected from the group consisting of vinylidene chloride, acrylonitrile and vinyl esters.

14. Solution of claim 13, wherein the vinyl esters are selected from the group consisting of vinyl acetate, acrylates, and esters of maleic acid and fumaric acid.

15. Solution of claim 12, wherein the total polymer concentration is between 10 and 18% by weight.

16. Solution of claim 12, wherein the water content of the solution is less than 5,000 ppm.

17. Solution of claim 12, wherein the weight ratio cellulose/polyvinyl chloride is between 0.1 and 0.5.

18. Process for the manufacture of the shapable solution of claim 12, wherein a solution of polyvinyl chloride is mixed whilst stirring, at a temperature which is at least 80° C., with a solution, in a mixture of dimethyl sulphoxide and formaldehyde, of cellulose having a degree of polymerisation of at least 200, which has been dried beforehand, the weight ratio cellulose/polyvinyl chloride being between 0.05 and 0.5.

19. Process of claim 18, wherein the polyvinyl chloride is in the form of a solution in dimethyl sulphoxide.

20. Process of claim 19, wherein the solution of polyvinyl chloride contains a heat stabiliser.

* * * * *